(12) United States Patent
Girouard et al.

(10) Patent No.: US 9,338,520 B2
(45) Date of Patent: May 10, 2016

(54) SYSTEM AND METHOD FOR APPLYING A DATABASE TO VIDEO MULTIMEDIA

(71) Applicant: Virage, Inc., San Francisco, CA (US)

(72) Inventors: David Girouard, San Francisco, CA (US); Bradley Horowitz, San Mateo, CA (US); Richard Humphrey, San Mateo, CA (US); Charles Fuller, Foster City, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 203 days.

(21) Appl. No.: 13/750,746

(22) Filed: Jan. 25, 2013

(65) Prior Publication Data

US 2013/0145388 A1 Jun. 6, 2013

Related U.S. Application Data

(60) Continuation of application No. 13/458,971, filed on Apr. 27, 2012, now Pat. No. 8,387,087, which is a continuation of application No. 10/872,191, filed on Jun. 18, 2004, now Pat. No. 8,171,509, which is a (Continued)

(51) Int. Cl.
*H04N 21/81* (2011.01)
*G06Q 30/02* (2012.01)
(Continued)

(52) U.S. Cl.
CPC ......... *H04N 21/812* (2013.01); *G06Q 30/0241* (2013.01); *G06Q 30/0251* (2013.01);
(Continued)

(58) Field of Classification Search
CPC ................ H04N 21/25; H04N 21/251; H04N 21/23424; H04N 21/45; H04N 21/4532; H04N 21/454; H04N 21/4668; G06Q 30/0241; G06Q 30/0251; G06Q 30/0269; G06Q 30/0271

See application file for complete search history.

(56) References Cited

U.S. PATENT DOCUMENTS 4,115,805 A 9/1978 Morton
4,334,241 A 6/1982 Kashioka et al.
(Continued)

FOREIGN PATENT DOCUMENTS

EP 545727 A2 12/1992
WO WO-92/22983 12/1992
(Continued)

OTHER PUBLICATIONS

"Frequently Asked Questions on MPEG-4 Video," International Organisation for Standardisation, printed from http://dgrogo.cselt.stet.it/mpeg/faq/faq-video.htm on Oct. 6, 1998 (7 pages).
(Continued)

*Primary Examiner* — Omar S Parra
(74) *Attorney, Agent, or Firm* — Mannava & Kang, P.C.

(57) ABSTRACT

A system and method for applying a database to video multimedia is disclosed. Certain embodiments provide media content owners the capability to exploit video processing capabilities using rich, interactive and compelling visual content on a network. Mechanisms of associating video with commerce offerings are provided. Video server and search server technologies are integrated with ad serving personalization agents to make the final presentations of content and advertising. Algorithms utilized by the system use a variety of techniques for making the final presentation decisions of which ads, with which content, are served to which user.

17 Claims, 8 Drawing Sheets

Related U.S. Application Data division of application No. 09/828,507, filed on Apr. 6, 2001, now abandoned.

(60) Provisional application No. 60/195,535, filed on Apr. 7, 2000.

(51) Int. Cl.
*H04N 21/45* (2011.01)
*H04N 21/466* (2011.01)
*H04N 21/478* (2011.01)
*H04N 21/84* (2011.01)

(52) U.S. Cl.
CPC ........ *G06Q30/0255* (2013.01); *G06Q 30/0269* (2013.01); *H04N 21/4532* (2013.01); *H04N 21/466* (2013.01); *H04N 21/47815* (2013.01); *H04N 21/84* (2013.01)

(56) References Cited

U.S. PATENT DOCUMENTS

| | | |
|---|---|---|
| 4,574,319 A | 3/1986 | Konishi |
| 5,027,400 A | 6/1991 | Baji et al. |
| 5,045,940 A | 9/1991 | Peters et al. |
| 5,136,655 A | 8/1992 | Bronson |
| 5,307,456 A | 4/1994 | MacKay |
| 5,335,072 A | 8/1994 | Tanaka et al. |
| 5,414,808 A | 5/1995 | Williams |
| 5,446,919 A | 8/1995 | Wilkins |
| 5,467,288 A | 11/1995 | Fasciano et al. |
| 5,481,296 A | 1/1996 | Cragun et al. |
| 5,485,553 A | 1/1996 | Kovalick et al. |
| 5,485,611 A | 1/1996 | Astle |
| 5,506,644 A | 4/1996 | Suzuki et al. |
| 5,508,940 A | 4/1996 | Rossmere et al. |
| 5,521,841 A | 5/1996 | Arman et al. |
| 5,535,063 A | 7/1996 | Lamming |
| 5,551,016 A | 8/1996 | Loeb et al. |
| 5,557,320 A | 9/1996 | Krebs |
| 5,561,457 A | 10/1996 | Cragun et al. |
| 5,566,290 A | 10/1996 | Silverbrook |
| 5,568,328 A | 10/1996 | Takahashi et al. |
| 5,574,845 A | 11/1996 | Benson et al. |
| 5,606,655 A | 2/1997 | Arman et al. |
| 5,613,032 A | 3/1997 | Cruz et al. |
| 5,633,678 A | 5/1997 | Parulski et al. |
| 5,642,285 A | 6/1997 | Woo et al. |
| 5,649,060 A | 7/1997 | Ellozy et al. |
| 5,655,117 A | 8/1997 | Goldberg et al. |
| 5,657,077 A | 8/1997 | DeAngelis et al. |
| 5,664,218 A | 9/1997 | Kim et al. |
| 5,664,227 A | 9/1997 | Mauldin et al. |
| 5,677,994 A | 10/1997 | Miyamori et al. |
| 5,680,639 A | 10/1997 | Milne et al. |
| 5,682,458 A | 10/1997 | Funazaki |
| 5,692,104 A | 11/1997 | Chow et al. |
| 5,701,153 A | 12/1997 | Reichek et al. |
| 5,706,290 A | 1/1998 | Shaw et al. |
| 5,706,457 A | 1/1998 | Dwyer et al. |
| 5,740,388 A | 4/1998 | Hunt |
| 5,745,637 A | 4/1998 | Phillips et al. |
| 5,751,280 A | 5/1998 | Abbott et al. |
| 5,767,893 A | 6/1998 | Chen et al. |
| 5,774,170 A | 6/1998 | Hile et al. |
| 5,774,664 A | 6/1998 | Hidary et al. |
| 5,777,612 A | 7/1998 | Kataoka |
| 5,778,181 A | 7/1998 | Hidary et al. |
| 5,794,249 A | 8/1998 | Orsolini et al. |
| 5,796,428 A | 8/1998 | Matsumoto et al. |
| 5,809,512 A | 9/1998 | Kato |
| 5,813,014 A | 9/1998 | Gustman |
| 5,815,201 A | 9/1998 | Hashimoto et al. |
| 5,818,512 A | 10/1998 | Fuller |
| 5,822,024 A | 10/1998 | Setogawa et al. |
| 5,822,537 A | 10/1998 | Katseff et al. |
| 5,826,102 A | 10/1998 | Escobar et al. |
| 5,828,809 A | 10/1998 | Chang et al. |
| 5,835,667 A | 11/1998 | Wactlar et al. |
| 5,838,314 A | 11/1998 | Neel et al. |
| 5,852,435 A | 12/1998 | Vigneaux et al. |
| 5,861,881 A | 1/1999 | Freeman et al. |
| 5,864,823 A | 1/1999 | Levitan |
| 5,870,754 A | 2/1999 | Dimitrova et al. |
| 5,872,565 A | 2/1999 | Greaves et al. |
| 5,872,865 A | 2/1999 | Normile et al. |
| 5,875,446 A | 2/1999 | Brown et al. |
| 5,884,056 A | 3/1999 | Steele |
| 5,889,578 A | 3/1999 | Jamzadeh |
| 5,890,175 A | 3/1999 | Wong et al. |
| 5,893,095 A | 4/1999 | Jain et al. |
| 5,898,441 A | 4/1999 | Flurry |
| 5,903,261 A | 5/1999 | Walsh et al. |
| 5,903,892 A | 5/1999 | Hoffert et al. |
| 5,911,139 A | 6/1999 | Jain et al. |
| 5,913,205 A | 6/1999 | Jain et al. |
| 5,915,250 A | 6/1999 | Jain et al. |
| 5,917,958 A | 6/1999 | Nunally et al. |
| 5,918,012 A | 6/1999 | Astiz et al. |
| 5,920,856 A | 7/1999 | Syeda-Mahmood |
| 5,926,205 A | 7/1999 | Krause et al. |
| 5,930,446 A | 7/1999 | Kanda |
| 5,930,493 A | 7/1999 | Ottesen et al. |
| 5,946,445 A | 8/1999 | Peters et al. |
| 5,953,005 A | 9/1999 | Liu |
| 5,963,702 A | 10/1999 | Yamashita |
| 5,969,716 A | 10/1999 | Davis et al. |
| 5,969,772 A | 10/1999 | Saeki |
| 5,974,572 A | 10/1999 | Weinberg et al. |
| 5,977,964 A | 11/1999 | Williams et al. |
| 5,982,979 A | 11/1999 | Omata et al. |
| 5,983,176 A | 11/1999 | Hoffert et al. |
| 5,983,237 A | 11/1999 | Jain et al. |
| 5,987,454 A | 11/1999 | Hobbs |
| 5,987,509 A | 11/1999 | Portuesi |
| 5,990,955 A | 11/1999 | Koz |
| 6,006,241 A | 12/1999 | Purnaveja et al. |
| 6,006,257 A | 12/1999 | Slezak |
| 6,006,265 A | 12/1999 | Rangan et al. |
| 6,009,410 A | 12/1999 | LeMole et al. |
| 6,009,507 A | 12/1999 | Brooks et al. |
| 6,014,183 A | 1/2000 | Hoang |
| 6,014,693 A | 1/2000 | Ito et al. |
| 6,018,768 A | 1/2000 | Ullman et al. |
| 6,034,942 A | 3/2000 | Yoshio et al. |
| 6,061,056 A | 5/2000 | Menard et al. |
| 6,065,050 A | 5/2000 | DeMoney |
| 6,084,595 A | 7/2000 | Bach et al. |
| 6,094,671 A | 7/2000 | Chase et al. |
| 6,112,226 A | 8/2000 | Weaver et al. |
| 6,115,717 A | 9/2000 | Mehrotra et al. |
| 6,119,123 A | 9/2000 | Elenbaas et al. |
| 6,119,154 A | 9/2000 | Weaver et al. |
| 6,134,243 A | 10/2000 | Jones et al. |
| 6,154,771 A | 11/2000 | Rangan et al. |
| 6,167,404 A | 12/2000 | Morcos et al. |
| 6,169,573 B1 | 1/2001 | Sampath-Kumar et al. |
| 6,170,065 B1 | 1/2001 | Kobata et al. |
| 6,173,287 B1 | 1/2001 | Eberman et al. |
| 6,185,527 B1 | 2/2001 | Petkovic et al. |
| 6,205,260 B1 | 3/2001 | Crinon et al. |
| 6,211,869 B1 | 4/2001 | Loveman et al. |
| 6,233,389 B1 | 5/2001 | Barton et al. |
| 6,236,395 B1 | 5/2001 | Sezan et al. |
| 6,240,553 B1 | 5/2001 | Son et al. |
| 6,259,828 B1 | 7/2001 | Crinon et al. |
| 6,285,788 B1 | 9/2001 | Sezan et al. |
| 6,289,346 B1 | 9/2001 | Milewski et al. |
| 6,295,092 B1 | 9/2001 | Hullinger et al. |
| 6,317,885 B1 | 11/2001 | Fries |
| 6,324,338 B1 | 11/2001 | Wood et al. |
| 6,356,658 B1 | 3/2002 | Sezan et al. |
| 6,360,234 B2 | 3/2002 | Jain et al. |
| 6,363,380 B1 | 3/2002 | Dimitrova |

(56) References Cited

U.S. PATENT DOCUMENTS

| | | |
|---|---|---|
| 6,370,543 B2 | 4/2002 | Hoffert et al. |
| 6,389,473 B1 | 5/2002 | Carmel et al. |
| 6,415,099 B1 | 7/2002 | Berger |
| 6,457,010 B1 | 9/2002 | Eldering et al. |
| 6,462,754 B1 | 10/2002 | Chakrabory et al. |
| 6,462,778 B1 | 10/2002 | Abram et al. |
| 6,463,444 B1 | 10/2002 | Jain et al. |
| 6,470,337 B1 | 10/2002 | Nihei |
| 6,473,804 B1 | 10/2002 | Kaiser et al. |
| 6,480,853 B1 | 11/2002 | Jain |
| 6,484,148 B1 | 11/2002 | Boyd |
| 6,498,897 B1 | 12/2002 | Nelson et al. |
| 6,505,160 B1 | 1/2003 | Levy et al. |
| 6,526,215 B2 | 2/2003 | Hirai et al. |
| 6,546,185 B1 | 4/2003 | Kim et al. |
| 6,567,980 B1 | 5/2003 | Jain et al. |
| 6,571,054 B1 | 5/2003 | Tonomura et al. |
| 6,591,247 B2 | 7/2003 | Stern |
| 6,606,117 B1 | 8/2003 | Windle |
| 6,640,145 B2 | 10/2003 | Hoffberg et al. |
| 6,654,030 B1 | 11/2003 | Hui |
| 6,675,174 B1 | 1/2004 | Bolle et al. |
| 6,686,970 B1 | 2/2004 | Windle |
| 6,698,020 B1 | 2/2004 | Zigmond et al. |
| 6,738,100 B2 | 5/2004 | Hampapur et al. |
| 6,760,749 B1 | 7/2004 | Dunlap et al. |
| 6,774,926 B1 | 8/2004 | Ellis et al. |
| 6,795,863 B1 | 9/2004 | Doty, Jr. |
| 6,801,576 B1 | 10/2004 | Haldeman et al. |
| 6,813,384 B1 | 11/2004 | Acharya et al. |
| 6,833,865 B1 | 12/2004 | Fuller et al. |
| 6,834,083 B1 | 12/2004 | Tahara et al. |
| 6,877,134 B1 | 4/2005 | Fuller et al. |
| 6,886,178 B1 | 4/2005 | Mao et al. |
| 7,017,173 B1 | 3/2006 | Armstrong et al. |
| 7,028,071 B1 | 4/2006 | Silk et al. |
| 7,093,191 B1 | 8/2006 | Jain et al. |
| 7,209,942 B1 | 4/2007 | Hori et al. |
| 7,222,163 B1 | 5/2007 | Girouard et al. |
| 7,260,564 B1 | 8/2007 | Lynn et al. |
| 7,295,752 B1 | 11/2007 | Jain et al. |
| 7,403,224 B2 | 7/2008 | Fuller et al. |
| 7,424,677 B2 | 9/2008 | Sezan et al. |
| 7,769,827 B2 | 8/2010 | Girouard et al. |
| 7,962,948 B1 | 6/2011 | Girouard et al. |
| 8,107,015 B1 | 1/2012 | Hampapur et al. |
| 8,171,509 B1 | 5/2012 | Girouard et al. |
| 2001/0012062 A1 | 8/2001 | Anderson |
| 2001/0014891 A1 | 8/2001 | Hoffert et al. |
| 2001/0018693 A1 | 8/2001 | Jain et al. |
| 2002/0054752 A1 | 5/2002 | Wood et al. |
| 2002/0056123 A1 | 5/2002 | Liwerant et al. |
| 2002/0184047 A1* | 12/2002 | Plotnick et al. ............... 705/1 |
| 2002/0191087 A1 | 12/2002 | Hashimoto et al. |
| 2002/0199194 A1 | 12/2002 | Ali |
| 2003/0078766 A1 | 4/2003 | Appelt et al. |
| 2003/0195877 A1 | 10/2003 | Ford et al. |
| 2005/0033760 A1 | 2/2005 | Fuller et al. |
| 2005/0076357 A1* | 4/2005 | Fenne ............... 725/14 |
| 2005/0198006 A1 | 9/2005 | Boicey et al. |
| 2005/0198677 A1 | 9/2005 | Lewis |
| 2005/0234985 A1 | 10/2005 | Gordon et al. |
| 2007/0282818 A1 | 12/2007 | Lynn et al. |
| 2007/0282819 A1 | 12/2007 | Lynn et al. |
| 2008/0028047 A1 | 1/2008 | Girouard et al. |
| 2008/0131072 A1 | 6/2008 | Chang et al. |
| 2008/0155616 A1* | 6/2008 | Logan et al. ............... 725/93 |
| 2011/0209170 A1* | 8/2011 | Schein et al. ............... 725/14 |
| 2011/0214144 A1 | 9/2011 | Girouard et al. |
| 2012/0128242 A1 | 5/2012 | Hampapur et al. |
| 2012/0215629 A1 | 8/2012 | Girouard et al. |

FOREIGN PATENT DOCUMENTS

| | | |
|---|---|---|
| WO | WO-96/12239 | 4/1996 |
| WO | WO-97/26758 | 7/1997 |

OTHER PUBLICATIONS

"How Flashpix Works," 1996, printed from http://www.digitalimaging.org/flashpix_howitworks.html on Oct. 6, 1998 (2 pages).

"How to Make Computer-Ready FlashPix Images," 1996, printed from http://www.flashpix.com/howtofpx/howtofpx.html on Oct. 6, 1998 (1 page).

"MPEG-7 Context and Objectives," International Organisation for Standardisation, printed from http://drogo.cselt.stet.it/mpeg/standards/mpeg-7/mpeg-7.htm on Oct. 6, 1998 (9 pages).

"MPEG-7 Frequently Asked Questions," International Organisation for Standardisation, printed from http://drogo.cselt.stet.it/mpeg/faq/faq_mpeg-7.htm on Oct. 6, 1998 (3 pages).

"NEC develops world's first professional quality digital optical disk camera," printed from http://info.nec.co.jp/english/today/newsrel/9611/0701.html on Nov. 30, 1998 (2 pages).

"Overview of the MPEG-4 Standard," International Organisation for Standardisation, printed from http://dgrogo.cselt.stet.it/mpeg/standards/mpeg-4/mpeg-4.htm on Oct. 6, 1998 (42 pages).

"Streaming Email", XP-002150023, Sep. 4, 1998, pp. 303-317.

8x8, Inc.—Chip Solutions, "Semiconductors: VCP Single Chip Video Codec and Multimedia Communications Processor," printed from http://www.8x8.com/oemchips/vcp.html on Jun. 15, 1999 (1 page).

Arman, F., Depommier, R., Hsu, Arding and Chiu, Ming-Yee, ACM Multimedia, pp. 97-103, (1994), "Content-Based Browsing of Video Sequences".

Arman, Farshid Hsu, Arding and Chiu, Ming-Yee, SPIE vol. 1908, pp. 2-12, (1993), "Feature Management for Large Video Databases".

Avid Answers, Avid Technology, Inc., vol. 2, No. 6, Nov./Dec. 1995.

Avid Answers, Avid Technology, Inc., vol. 3, No. 1, Jan./Feb. 1996.

Babaguchi, et al., Event based indexing of broadcasted sports video by Intermodal Collaboration, IEEE Transactions on Multimedia, V. 4, Issue 1, Mar. 2002, pp. 68-75.

Broadcast Update, Avid Technology, Inc., vol. 1, No. 1. Oct. 1996.

Chen, et al., "Metadata for Mixed-media Access", SIGMOD Record, vol. 23, No. 4, Dec. 1994, 8 pgs.

Editors: Non-Linear: ES7, printed from http://bpgprod.sel.sony.com/modelfeatures.bpg?cat=Editors&subcat=Non-Linear@model+ES7 on Dec. 17, 1998 (2 pages).

Evans, "Computerized Analysis of Television Content: Advanced Imaging for the Social Sciences," (Nov. 1999), Advanced Imaging, p. 17-18.

Excalibur Technologies, (1998), Vienna Virginia (Brochure), "Excalibur Screening Room™: The Intelligent Way to Reveal and Leverage Video Content".

Film and Television Update, Avid Technology, Inc., vol. 1, No. 1, Jul. 1997.

Glavitsch, et al., "Metadata for Integrating Speech Documents in a Test Retrieval System", SIGMOD Record, vol. 23, No. 4, Dec. 1994, 7 pgs.

Hampapur, Arun, Gupta, Amarnath, Horowitz, Bradley, Shu, Chiao-Fe, et al., Virage Inc. , Mar. 1997, San Mateo, California, "Virage Video Engine".

Hjelsvold, et al., Web-based personalization and management of interactive video, International World Wide Web Conference, Year 2001, pp. 129-139.

Islip Media, MediaKey Digital Video Library System Demonstration, NAB (1998) (Information Sheet) "Unlocking the Value of Video".

Java Script XML Parser, http://www.stylusstudio.com/xmldev/199712/post70460.html, pp. 1-3, Dec. 31, 1997.

Johnston et al., "Real-time Digital libraries based on Widely Distributed, High Performance Management of Large-Data-Objects": International Journal of Digital Libraraies, vol. 1, No. 3, Dec. 1997.

Kashyap, et al., "Metadata for Building the MultiMedia Patch Quilt", Multimedia Database Systems: Issues and Research Directions, 1995, www.cs.uga.edu/LSDIS, 23 pgs.

(56) References Cited

OTHER PUBLICATIONS

Little et al., A Digital On-Demand Video Service Supporting Content-Based Queries, Aug. 1-6, 1993.
Luther, Arch C., "Video Camera Technology," 1998, Figure 4.1.1 Signal Processing Block Diagram (3 pages total).
MultiMedia Access Corporation—Osprey-1000, printed from http://www.viewcast.com/osprey1000.html on Jun. 11, 1999 (6 pages).
Office Action for U.S. Appl. No. 10/872,191 dated Mar. 27, 2008.
Page from Akamai Web Site, "How EdgeScape Works," http://www.akamai.com/html/en/sv/edgescape_works.html, printed Mar. 27, 2001.
Page from Innovatv.com Web Site, "iMag," http://www.innovatv.com/iMag.htm, printed Mar. 20, 2000.
Page from Innovatv.com Web Site, "myiMag.com," http://www.myimag.com/afterlogin4.asp, printed Mar. 20, 2000.
Page from Innovatv.com Web Site, "Seeing is believing," http://www.innovatv.com/news_011000_em.htm, Jan. 10, 2000.
Page from Innovatv.com Web Site, "Tools & Technology," http://www.innovatv.com/tools.htm, printed Mar. 20, 2000.
Page from MediaSite Web Site, "Branded MediaSites," http://www.mediasite.net/info/ps_branded.htm, printed Jul. 28, 2000.
Page from MediaSite Web Site, "First Searchable Video Website Solution Adds New Content Providers," http://www.mediasite.net/info/prcontent.htm, Jun. 24, 1999.
Page from MediaSite Web Site, "MediaSite Publisher Modules," http://www.mediasite.net/info/ps_mkbul.htm, printed Jul. 28, 2000.
Page from MediaSite Web Site, "MediaSite WebFinder 4.0," http://www.mediasite.net/info/ps_mkfin.htm, printed Jul. 28, 2000.
Page from the Search Engine Watch Web Site, "SpiderSpotting Chart," http://www.searchenginewatch.com/webmasters/spiderchart.html, printed Mar. 30, 2001.
Page from Virage Web Site, "MyLogger," www.virage.com/products/mylogger.html, printed Jan. 6, 2000.
Page from Virage Web Site, "Press Releases," www.virage.com/news/dec_1999_mylogger-launch.html, Dec. 7, 1999.
Page from Virage Web Site, "Video Search Tools," www.virage.com/products/vst.html, printed Jan. 6, 2000.
Page from Virage Web Site, "Virage Interactive," http://www.virage.com/products/vi.html, printed Jan. 6, 2000.
PR Newswire Association, Inc., "Duquesne University to Offer First Searchable Video Classes Over the Web; Partners With ISLIP Media to Build Advanced Internet Video Classes," Dec. 15, 1998.
Rapoza, "Spider spins power searches," PC Week, May 10, 1999.
Rigby, Martin, "What is FlashPix?," 1996, printed from http://www.flashpix.com/WhatIsfpx.html on Oct. 6, 1998 (1 page).
Rowley, Henry A., Baluja, Shumeet and Kanade, Takeo, CMU-CS-95-158R, Nov. 1995, Pittsburgh, Pennsylvania, "Human Face Detection in Visual Scenes".
Sherman, Howard, Howard Sherman Public Relations News, Apr. 9, 1998 (News Release), "Ingenious Realtime Video Archival & Retrieval Solution".
Smith, Aguirre T., Davenport, G., ACM Workshop on Networking and Operating System Support for Digital Audio and Video (1992), San Diego, California, pp. 250-261, "The Stratification System : A Design Environment for Random Access Video".
Smith, Aguirre T., MIT MS Thesis (1992), "If You Could See What I Mean . . . ".
Smith, Aguirre T., Multimedia—For Now & the Future, Summer Proceedings, USENIX Technical Conference and Exhibition (1991), pp. 157-168, "Parsing Movies in Context".
Smith, Michael A. and Kanade, Takeo, CMU-CS-95-186 , Jul. 30, 1995, Pittsburgh, Pennsylvania, "Video Skimming for Quick Browsing Based on Audio and Image Characterization".
The Content Group, Content Watch, vol. 1 No. 5. pp. 20-22, (1998), "Islip Media Delivers Advanced Tools for Video Indexing and Retrieval".
The Content Group, Content Watch, vol. 1 No. 5. pp. 6-7, 23, (1998), "Excalibur Enters the Video Market With the Release of Excalibur Screening Room".
The IEEE Standard Dictionary of Electrical and Electronics Terms, IEEE STD 100-1996, Published by Institute of Electrical and Electronics Engineers, Inc., Sixth Edition, p. 648.
Videotape and Disk Recorders: DVCAM: DSR1, printed from http://bpgprod.sel.sony.com/modelfeatures.bpg?cat+Videotape+and+Disk+Recprd . . . on Dec. 17, 1998 (2 pages).
Virage, Inc. Brochure, "MyLogger™," Copyright 1999.
Virage, Inc. Brochure, "Video Search Tools," Copyright 1999.
Virage, Inc. Brochure, "Virage Interactive™," Copyright 1999.
Virage, Inc., "The Virage Video Cataloger 1.3," 1998, San Mateo, CA (brochure).
Virage, Inc., "Virage Releases VideoLogger 2.0 at Streaming Media '98 Conference" 1998, San Mateo, CA (brochure).
Virage, Inc., "Virage Video Cataloger & Video Browser," 1997, San Mateo, CA (brochure).
Virage, Inc., "The Virage Media Management System", (1997), San Mateo, California (Brochure).
Virage, Inc., The Virage Media Manager & Browser 1.1, (1998), San Mateo, California (Brochure), "Place Your Media Assets Within Reach of Your Entire Enterprise".
Virage, Inc., The Virage Video Cataloger 1.1, (1998), San Mateo, California (Brochure), "Discover a Highly Efficient Approach to Video Cataloging".
Visionary, Media Access Technologies, Ltd., (1998) (Brochure) "Automated Logging and Search Solution for Multimedia Streams and Libraries".
Zhang, et al.,A Natural language approach to content-based video indexing and retrieval for interactive E-learning, IEEE Transactions on Multimedia, V.6, Issue 3, Jun. 2004, pp. 450-458.
Zhou, et al., A web-enabled video indexing system, International Multimedia Conference, year 2004, pp. 307-314.

\* cited by examiner

Targeted Advertising

SYSTEM AND METHOD FOR APPLYING A DATABASE TO VIDEO MULTIMEDIA

RELATED APPLICATIONS

This application is a continuation application of commonly assigned and copending U.S. patent application Ser. No. 13/458,971, filed on Apr. 27, 2012, which is a continuation application of U.S. application Ser. No. 10/872,191, filed Jun. 18, 2004, and issued as U.S. Pat. No. 8,171,509, which is a divisional application of U.S. application Ser. No. 09/828,507, filed Apr. 6, 2001, which claims the benefit of U.S. Provisional Application No. 60/195,535, filed Apr. 7, 2000, each of which are hereby incorporated by reference in their entirety.

This application is related to U.S. application Ser. No. 09/827,772, filed Apr. 6, 2001 and titled "SYSTEM AND METHOD FOR HOSTING OF VIDEO CONTENT OVER A NETWORK," and issued as U.S. Pat. No. 7,222,163, U.S. application Ser. No. 09/828,618, filed Apr. 6, 2001 and titled "VIDEO-ENABLED COMMUNITY BUILDING," and issued as U.S. Pat. No. 7,962,948, and U.S. application Ser. No. 09/828,506, filed Apr. 6, 2001 and titled "NETWORK VIDEO GUIDE AND SPIDERING," and issued as U.S. Pat. No. 7,260,564, each of which are hereby incorporated by reference in their entirety.

BACKGROUND

1. Field

The present invention generally relates to the field of applying a database to video multimedia. More particularly, the invention relates to techniques for applying a database for accessing and processing digital video on a network.

2. Description of the Related Technology

A number of techniques have evolved in recent years as the Internet has grown in size and sophistication, including:

The use of web servers and HTML delivery to web browsers.

The use of the application-server model for connecting database information with web pages and interactive interfaces for end users.

The use of dynamically generated HTML that pulls information from a database to dynamically format HTML for delivery to the end user.

The use of a template language to merge database output with pre-formatted HTML presentations.

The use of 'cookies' to track individual user preferences as they interact with the web pages and applications.

The use of e-commerce engines and financial transaction processing technology (such as available from IBM, Qpass, Oracle, etc.)

The use of agent technology to build and manage personalization profiles (such as available from Autonomy, Semio, Cyber Dialog, Net Perceptions, etc.)

The use of auto-categorization technologies to take a segment of transcript or a document, and analyze it using natural language processing techniques to identify category labels that apply to the body of text. Example vendors of these technologies (which also offer search technologies as well) include Webmind, Verity, Autonomy, and Semio.

These and other related web technologies and techniques are in commonplace use and readily accessible on the Internet.

In addition to theses technologies, video indexing technology has also emerged, herein referred to as 'video logging'. Video logging is a process that incorporates both automated indexing and manual annotation facilities to create a rich, fine-grained (in a temporal sense) index into a body of video content. The index typically consists of a combination of visual and textual indices that permit time-based searching of video content. The index may incorporate spoken text, speaker identifications, facial identifications, on-screen text, and additional annotations, keywords, and descriptions that may be applied by a human user executing the video logging application. The Virage VideoLogger® is one example of this type of video logging technology that is commercially available.

The delivery of streaming media on the Internet typically involves the encoding of video content into one or more streaming video formats and efficient delivery of that content for display to the end users. Common streaming formats presently in use include RealVideo, Microsoft Windows Media, QuickTime, and MPEG. The video logging technology may coordinate the encoding of one or more of these formats while the video is being indexed to ensure that the video index is time-synchronized with the encoded content. The final delivery of streaming media content for display to an end user is typically accomplished with a wide variety of video serving mechanisms and infrastructure. These mechanisms may include basic video servers (such as those from Real, Microsoft, or Apple), caching appliances (such as those from CacheFlow, Network Appliance, Inktomi, or Cisco), and content distribution networks (herein "CDN's", such as those from Akamai, Digital Island, iBeam, or Adero). These types of video serving mechanisms ultimately deliver media content for display to the end user.

In an Internet/World Wide Web environment, companies frequently attempt to generate revenue though advertising and electronic commerce (hereinafter referred to as e-commerce) within their website. Whether selling products, services, or advertising, they all have a primary need to engage visitors in a compelling presentation of their offering, or something associated with their offering that ultimately convinces the visitor to make a purchase or follow an ad link, thus generating revenue for the company.

Increased visitors, repeat visitors, and increased visitation time all contribute to revenue streams derived from standard advertising models. In addition, these increased visitation properties also allow more numerous and frequent opportunities for e-commerce (products and services). E-commerce-based Websites exploiting video share the common goal of using rich and interactive media content (such as video) to more effectively sell products and services. Compelling video content can be used to create web experiences that are more efficient and compelling in terms of communicating value and relevance to the (potential) customer. Highly-targeted advertising and e-commerce is made possible by associating demographic and product/service information with video content. Consumers are more likely to respond to targeted offerings than random offerings, thus making the website more productive.

Therefore, what is needed in the technology is a system that effectively uses and manages video in a central role for commerce-oriented websites so as to increase their success. What is desired are mechanisms of associating video with commerce offerings, which in turn, can be used to build the websites and e-commerce tools that many companies and website owners want.

SUMMARY OF CERTAIN INVENTIVE ASPECTS

The present system and method relate to techniques whereby various traditional mechanisms are combined in an innovative way with an interactive video search and retrieval application environment. Video content is indexed and encoded using applications such as, for example, the VideoLogger available from Virage. The index provides a rich, fine-grained search mechanism to access the video in a non-linear fashion. This turns interactive video into a useful and attractive feature on a website. The use of auto-categorization technology allows the system to automatically identify category designations of the content during the indexing phase, where the categories are useful in the process of selecting relevant ads and commerce options to be presented to the user. Thus, the index is structured to also provide higher level topic and category information.

A video search and retrieval application gives website visitors the ability to search media content to find segments that are of interest. Utilizing these search and retrieval capabilities and a repository of engaging content, various mechanisms can be added.

In one embodiment, there is a method of applying a database to video multimedia, the method comprising indexing video content; storing the indexed video content in an index database, the indexed video content comprising metadata; encoding the video content concurrent with the indexing of the video content, wherein the index database does not contain the encoded video content; and storing in the index database at least one tag correlated with the video content on a time-code basis, wherein the tag is valid for a certain span of time within the video, and wherein the tag is configured to be associated with an advertisement or ecommerce opportunity, wherein the method is carried out in a computing environment.

The method may additionally comprise making associations between the video content and at least one of ad banners, product offerings, and service offerings so that such items are associated with the tags. The method may additionally comprise collecting a user profile describing the content that is most of interest to the user. The method may additionally comprise learning the user profile by monitoring usage patterns of the user. The user profile may be combined with the tags so as to make targeted associations between at least one of ads, products, services, and a person viewing the video content. The method may additionally comprise storing a plurality of indices that result from the indexing in the index database, wherein each stored index may be associated with one of a plurality of different metadata types and at least a portion of the stored indices are associated with different ones of the metadata types. The method may additionally comprise algorithmically selecting a metadata element from a plurality of metadata elements in the user profile, wherein the algorithmic selecting utilizes one of cyclic, least-recently used, or random selection. The method may additionally comprise algorithmically selecting an advertisement or ecommerce opportunity based on the selection of the metadata element. The algorithmic selecting of the advertisement or ecommerce opportunity may utilize at least one of heuristics, fuzzy logic or hidden Markov models. The method may additionally comprise algorithmically selecting an advertisement or ecommerce opportunity based on selected metadata of the video content. The selected advertisement or ecommerce opportunity may be configured for display concurrently with viewing of video content that is played. The data corresponding with a metadata type may have a time span that is different than the data corresponding with another metadata type.

In another embodiment, there is a non-transitory computer readable medium containing program instructions for applying a database to video multimedia, wherein execution of the program instructions by a computing environment carries out a method, comprising indexing video content; storing a plurality of indices that result from the indexing in an index database, the indices comprising metadata; encoding the video content concurrent with the indexing of the video content, wherein the index database does not contain the encoded video content; storing in the index database a plurality of tags correlated with the video content on a time-code basis via the index database; collecting, with a personalization agent, a user profile describing the content that is most of interest to the user; algorithmically selecting a single metadata type from a plurality of metadata types in the user profile; and algorithmically selecting an advertisement or ecommerce opportunity associated with the selected single metadata type. The method embodied by program instructions may additionally comprise combining the user profile with the tags so as to make targeted associations between at least one of ads, products, services, and the person viewing the video content. The method embodied by program instructions may additionally comprise making associations between the video content and at least one of ad banners, product offerings, and service offerings so that such items are associated with the tags.

In yet another embodiment, there is a system for applying a database to video multimedia, the system comprising a computing environment configured to index video content; a computer database accessed by the computing environment, the computer database storing a plurality of indices that result from indexing the video content, the indices comprising metadata, wherein each stored index is associated with one of a plurality of different metadata types and at least a portion of the stored indices are associated with different ones of the metadata types; the computing environment further configured to encode the video content concurrent with the indexing of the video content, wherein the database does not contain the encoded video content; store in the database a plurality of tags correlated with the video content on a time-code basis via the computer database; make associations between the video content and at least one of ad banners, product offerings, and service offerings so that such items are synchronized via the tags; and algorithmically select an advertisement or ecommerce opportunity based on metadata of the video content. At least one of the tags may be valid for a certain span of time within the video. The computing environment may be further configured to collect a user profile describing the content that is most of interest to the user. The user profile may be combined with the tags so as to make targeted associations between at least one of ads, products, services, and a person viewing the video content.

In yet another embodiment, there is a method of applying a database to video multimedia, the method comprising indexing video content to generate an index; storing the index in an index database; encoding the video content concurrent with the indexing of the video content, wherein the index database does not contain the encoded video content; and associating a plurality of tags with the video content on a time-code basis via the database, wherein at least one of the tags is valid for a certain span of time within the video.

BRIEF DESCRIPTION OF THE DRAWINGS

The above and other aspects, features and advantages will be better understood by referring to the following detailed description, which should be read in conjunction with the accompanying drawings. These drawings and the associated description are provided to illustrate certain embodiments, and not to limit the scope of the invention.

DETAILED DESCRIPTION OF CERTAIN EMBODIMENTS

Figure 1:
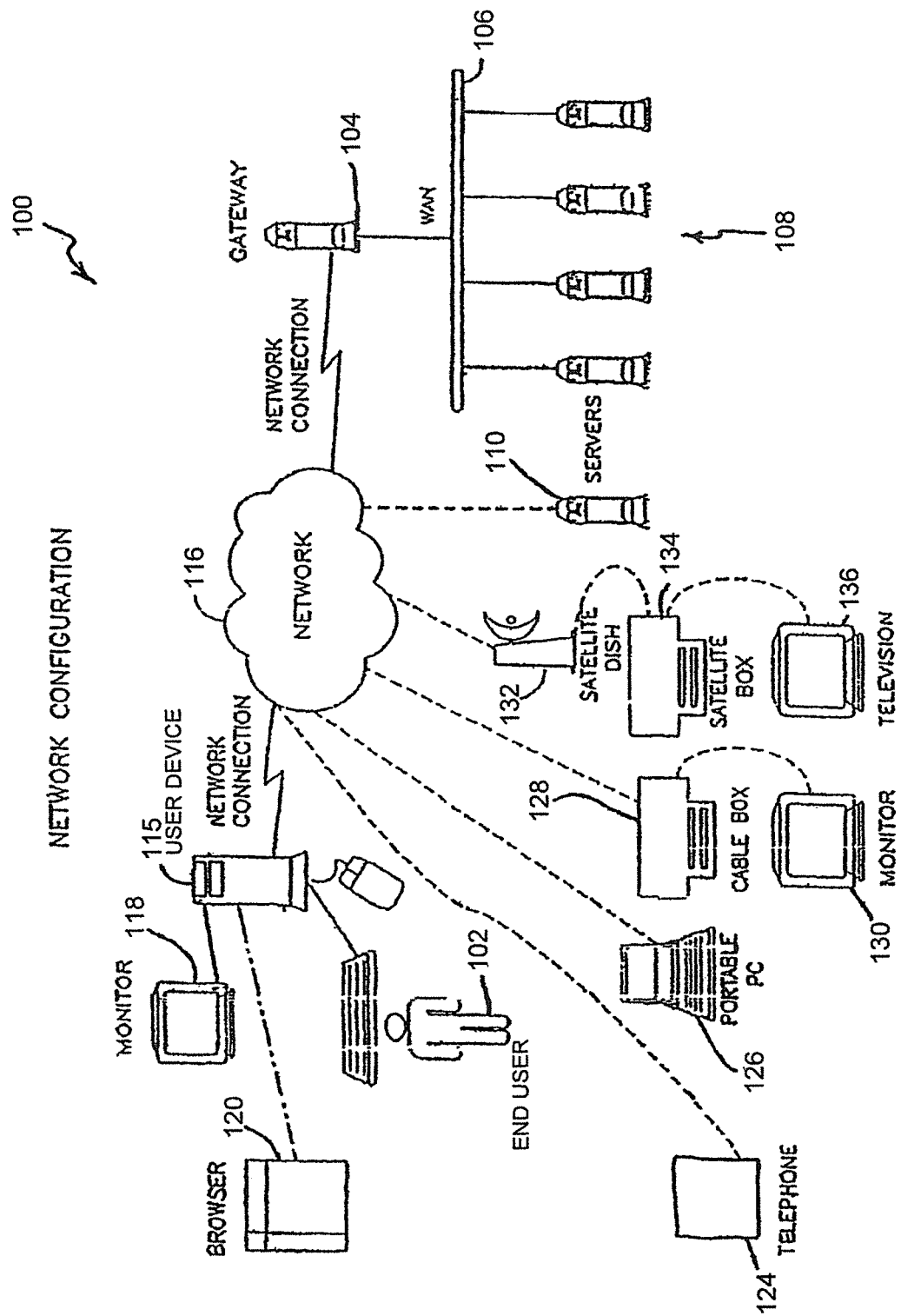
FIG. 1 is a diagram of an example network configuration in which certain embodiments may operate.

The following detailed description of certain embodiments presents various descriptions of specific embodiments. However, the present invention can be embodied in a multitude of different ways as defined and covered by the claims. In this description, reference is made to the drawings wherein like parts are designated with like numerals throughout.

DEFINITIONS

The following provides a number of useful possible definitions of terms used in describing certain embodiments.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A website may refer to one or more interrelated web page files and other files and programs on one or more web servers. The files and programs are accessible over a computer network, such as the Internet, by sending a hypertext transfer protocol (HTTP) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

A web page or electronic page may comprise that which is presented by a standard web browser in response to an HTTP request specifying the URL by which the web page file is identified. A web page can include, for example, text, images, sound, video, and animation.

Content, media content and streaming media content may refer to the delivery of electronic materials such as music, videos, software, books, multimedia presentations, images, and other electronic data, for example over a network to one or more users. Content data will typically be in the form of computer files for video, audio, program, data and other multimedia type content as well as actual physical copies of valuable content, for example CD-ROM, DVD, VCR, audio, TV or radio broadcast signals, streaming audio and video over networks, or other forms of conveying such information. The terms content, media content and streaming media content may be used interchangeably.

A computer or computing device may be any processor controlled device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, Unix, any of the versions of Microsoft Windows, Apple MacOS, IBM OS/2 or other operating system. The appropriate operating system may include a communications protocol implementation that handles all incoming and outgoing message traffic passed over the Internet. In other embodiments, while the operating system may differ depending on the type of computer, the operating system will continue to provide the appropriate communications protocols to establish communication links with the Internet.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to the website. In this instance, the website includes program logic, which enables the website to communicate with the externally implemented components, modules, and databases to perform the functions as disclosed herein.

Overview of Auto-Categorization

Auto-categorization of content, specifically applying a category to a given time segment of the video, is particularly useful in certain embodiments. Video logging applications (such as the Virage VideoLogger) can typically accept novel signal and linguistic analysis algorithms to further refine and extend the metadata index generated during the logging phase. Several vendors offer categorization algorithms and technology, such as Webmind, Verity, Autonomy, and Semio. Extensibility and how it is used to integrate additional technology, such as categorization, is described in Applicant's copending U.S. patent application Ser. No. 09/134,497, entitled "Video Cataloger System With Synchronized Encoders", which is hereby incorporated by reference. Categorization technology from any of these vendors can thus be integrated into the logging phase. Each of these technologies accepts an input stream of text and responds with a category designation. The categories are used in the process of selecting relevant ads and commerce options to be presented to the user. Most of these offerings require a training phase whereby a known body of content and corresponding categories are provided to the categorization engine, and a linguistic model is constructed. Thereafter, as new content is submitted to the engine, it can reliably generate category designations. These systems are effective across multiple languages, and are relatively new and rapidly maturing. Auto-categorization of content is utilized because it offers the ability to scale the content processing up to large volumes within an automatic process. Manual solutions are also available (e.g., human editors making judgment calls on the content) but are much less scalable in a business sense.

Overview of E-Commerce Mechanisms

A video search and retrieval (e.g., browse) application gives website visitors the ability to search media content to find segments that are of interest. Utilizing these search and retrieval capabilities and a repository of engaging content, various e-commerce mechanisms can be added on. Ad banners, product offerings, and service offerings can each be triggered to appear in a synchronized fashion with video content being viewed by the end-user. For example, a product demonstration video can be viewed with associated links and mechanisms to purchase the product. A sports video can have sneaker ads automatically interspersed. These associations are made possible by associating keyword 'tags' with video content on a time-code basis. The tag is 'valid' for a certain span of time within the video. A metadata model, time spans, time stamps and other related concepts are further described in Applicant's copending U.S. patent application Ser. No. 09/134,497, entitled "Video Cataloger System With Synchronized Encoders", especially in conjunction with FIGS. 6, 7, 8 and 9 of the application.

A related mechanism for targeting advertising and e-commerce is also disclosed. Given a repository of indexed video as described above, it is also possible to create 'personalization agents' to exploit user information, in addition to content-based information, in the targeting process. A personalization agent gathers a specification (a 'profile') from the user describing the content, products, and servers that are most of interest to the user. Additionally, a personalization agent has the ability to 'learn' the personalization profile by monitoring the usage patterns of the user. The personalization profile, combined with content-based tagging, can be used to make highly-targeted associations between ads, products, services, and the person viewing the content.

Video server and search server technologies are integrated with ad serving personalization agents to make the final presentations of content, advertising, and commerce. The algorithms for making the final presentation decisions (which ads with which content served to which user) may be made using combinations of any of the following: look-up tables, keyword intersections, heuristics, fuzzy-logic, Hidden Markov Models (HMM's), and so forth.

DESCRIPTION OF THE FIGURES

FIG. 1 is a diagram of an example network configuration 100 in which certain embodiments may operate. However, various other types of electronic devices communicating in a networked environment may also be used. An end user 102 communicates with a computing environment, which may include multiple server computers 108 or a single server computer 110 in a client/server relationship on a network communication medium 116. In a typical client/server environment, each of the server computers 108, 110 may include a server program that communicates with a user device 115, which may be a personal computer (PC), a hand-held electronic device, a mobile or cellular phone, a TV set or any number of other electronic devices.

The server computers 108, 110, and the user device 115 may each have any conventional general purpose single- or multi-chip microprocessor, for example a Pentium processor, a Pentium Pro processor, a MIPS processor, a Power PC processor, an ALPHA processor, or other processor. In addition, the microprocessor may be any conventional special purpose microprocessor such as a digital signal processor or a graphics processor. Additionally, the server computers 108, 110 and the user device 115 may be desktop, server, portable, hand-held, set-top, or other desired type of computing device.

Furthermore, the server computers 108, 110 and the user device 115 each may be used in connection with various operating systems, including, for example, UNIX, LINUX, Disk Operating System (DOS), VxWorks, PalmOS, OS/2, any version of Microsoft Windows, or other operating system.

The server computers 108, 110 and the user device 115 may each include a network terminal equipped with a video display, keyboard and pointing device. In one embodiment of the network configuration 100, the user device 115 includes a network browser 120 used to access the server computers 108,110. The network browser 120 may be, for example, Microsoft Internet Explorer or Netscape Navigator. The user 102 at the user device 115 may utilize the browser 120 to remotely access the server program using a keyboard and/or pointing device and a visual display, such as a monitor 118. Although FIG. 1 shows only one user device 115, the network configuration 100 may include any number of client devices.

The network 116 may be any type of electronic transmission medium, for example, including but not limited to the following networks: a virtual private network, a public Internet, a private Internet, a secure Internet, a private network, a public network, a value-added network, an intranet, or a wireless gateway. The term "virtual private network" refers to a secure and encrypted communications link between nodes on the Internet, a Wide Area Network (WAN), Intranet, or any other network transmission means.

In addition, the connectivity to the network 116 may be via, for example, a modem, Ethernet (IEEE 802.3), Token Ring (IEEE 802.5), Fiber Distributed Datalink Interface (FDDI), Asynchronous Transfer Mode (ATM), Wireless Application Protocol (WAP), or other form of network connectivity. The user device 115 may connect to the network 116 by use of a modem or by use of a network interface card that resides in the user device 115. The server computers 108 may be connected via a wide area network 106 to a network gateway 104, which provides access to the wide area network 106 via a high-speed, dedicated data circuit.

As would be understood by one skilled in the technology, devices other than the hardware configurations described above may be used to communicate with the server computers 108, 110. If the server computers 108, 110 are equipped with voice recognition or Dual Tone Multi-Frequency (DTMF) hardware, the user 102 may communicate with the server computers by use of a telephone 124. The telephone may optionally be equipped with a browser 120 and display screen. Other examples of connection devices for communicating with the server computers 108, 110 include a portable personal computer (PC) 126 or a personal digital assistant (PDA) device with a modem or wireless connection interface, a cable interface device 128 connected to a visual display 130, or a satellite dish 132 connected to a satellite receiver 134 and a television 136. Still other methods of allowing communication between the user 102 and the server computers 108, 110 are additionally contemplated by this application.

Additionally, the server computers 108, 110 and the user device 115 may be located in different rooms, buildings or complexes. Moreover, the server computers 108, 110 and the user device 115 could be located in different geographical locations, for example in different cities, states or countries. This geographic flexibility which networked communications allows is additionally within the contemplation of this application.

Figure 2:
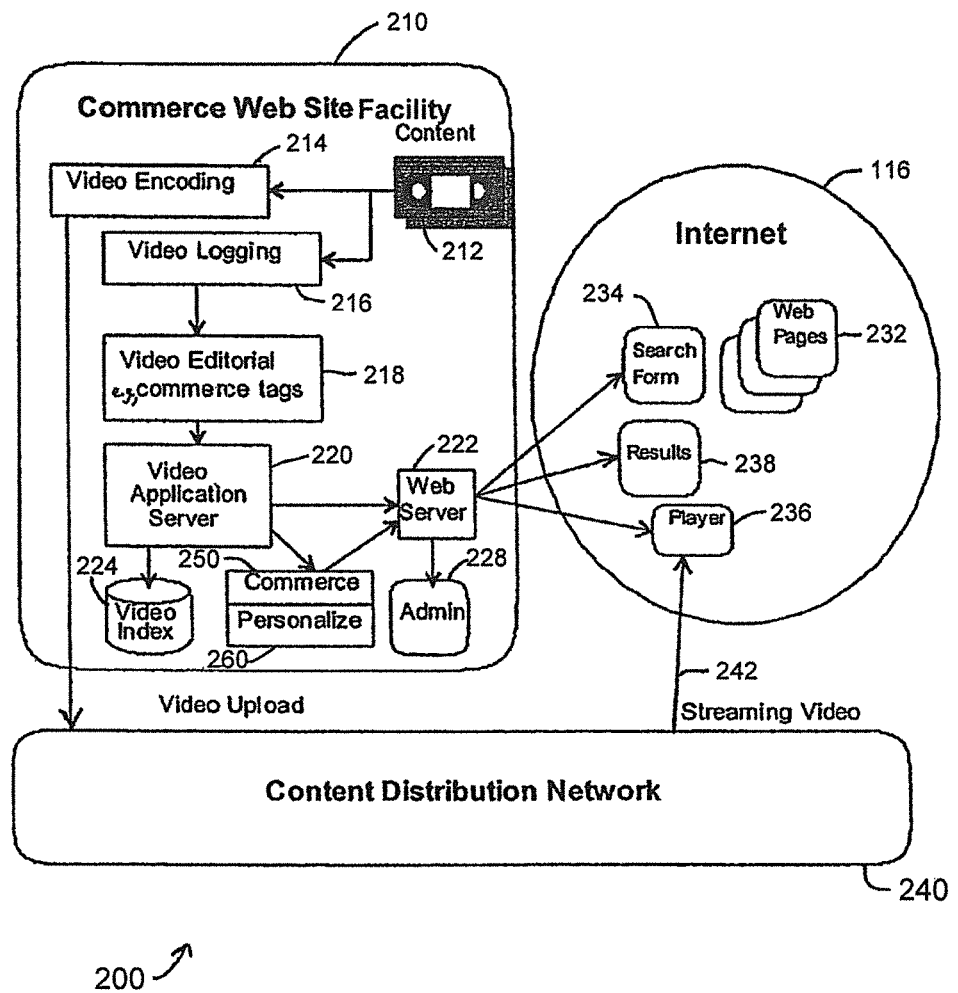
FIG. 2 is a block diagram of an example system architecture in accordance with certain embodiments.

FIG. 2 is a block diagram of an example system architecture 200 in accordance with certain embodiments. In one embodiment, the system architecture 200 includes a commerce website facility 210, which further includes a video encoding module 214 and a video logging module 216, both of which receives media content 212, in one embodiment. Although the term facility is used, the components do not necessarily need to be at a common location. The commerce website facility 210 further includes a video editorial module 218, which communicates with the video logging module 216. The commerce website facility 210 further includes a video application server 220, which communicates with the video editorial module 218. The commerce website facility 210 further includes a web server 222, which communicates with the video application server 220. The commerce website facility 210 further includes a video index 224, which is produced by the video logging module 216 and the video editorial module 218, and is maintained by the video application server 220. The commerce website facility 210 further includes a server administration ("Admin") module 228, which communicates with the web server module 222. The commerce website facility 210 further includes a commerce module 250 and a personalization module 260, both of which communicate with the video application server 220 and the web server 222. The commerce module 250 and the personalization module 260 are described in greater detail below with regards to certain embodiments of FIG. 2, and additionally in reference to FIGS. 4 through 7.

In one embodiment, the system architecture 200 further includes the network 116 shown in FIG. 1, which may be the Internet. Web pages 232 and search forms 234 are accessible via the Internet 116. Each web page 232 may depict a plurality of pages rendered by various web servers. The search form 234 is also accessible by the commerce website facility web server 222. Additionally accessible via the Internet 116 is results data 238, which is produced by the web server 222. Also accessible via the Internet 116 is a video player 236, which communicates with the web server 222. The system architecture 200 further includes a content distribution network 240, which transfers encoded video to the video player 236. The content distribution network 240 further receives uploaded digital video files from the video encoding module 214. The content distribution network 240 may be part of a wide variety of video serving mechanisms and infrastructures that serve to deliver encoded media content 242 for display to the end user 102 shown in FIG. 1. The content distribution network 240 may include a content owner running a simple video server at the content owner facility 220, a complex edge caching content distribution mechanism, or other mechanisms to transmit video and other media content for display to end users 102.

The following paragraphs provide a description of the operation of one embodiment of the system architecture 200 shown in FIG. 2. A commerce website may be hosted internally on the commerce web server 222 as shown in FIG. 2, or alternatively outsourced to a web-hosting service provider, which delivers commerce features as described herein to end users 102. The operation of the video encoding module 214, video logging module 216, video editorial module 218, video application server module 220, video index 224, administration module 228, and web server 222 are described with respect to embodiments disclosed in the related application titled "Interactive Video Application Hosting" (U.S. application Ser. No. 09/827,772), which was incorporated by reference above. To the extent that these modules may operate differently in certain embodiments than in the related application, any such differences will be described herein.

In one embodiment, the video application server module 220 manages the video index containing metadata and annotations produced by the video logging module 216. The application server 220 receives video and metadata after the video logging 216 and video editorial 218 modules, and transfers video search form 234 queries and results 238 data to the web server 222 for display to an end user 102 (FIG. 1) in a web browser 120 at the user device 115 via the Internet 116. In one embodiment, the communication of the search form 234 queries and results 238 data to the web server 222 includes an exchange of extensible markup language (XML) data, although one skilled in the technology will understand that other data exchange formats may also be utilized. Final HTML rendering of search foams 234, results 238 presentation, and video player 236 playback windows may be accomplished via templates, whereby such templates dictate the graphical look-and-feel of the final media presentation. Actual metadata results, communicated via XML or other data exchange formats, may be rendered into the template by substituting special keywords with results from the video application server 220 to form an HTML-compliant presentation. Additional communications may be provided with the administration module 228 for server administration, metadata editing, and batch processing. Batch processing may be accomplished for insertion processes, deletion or 'aging' processes, metadata editing, or for automated performance of other tasks as well. The administration module 228 further allows system administrators to manage the video application server 220, including, for example, index management, asset management, editing, and startup and shutdown control.

In one embodiment, regardless of its original form, the content 212 is processed by the video logging module 216 to extract index data, for example keyframes, closed-caption text, speaker identifications, facial identifications, or other index data. The content 212 may additionally undergo processing by the video editorial module 218, whereby humans may elect to add labels to the index of the content 212 by providing additional annotations, descriptions, keywords, or any other marking information such as commerce tags. The index and annotation information is transferred to the video application server 220, which hosts publishing, search, retrieval, browse, or other related video services. The video application server 220 may maintain the metadata in the video index 224. The video application server 220 provides the above-described video services to the web server 222 for incorporation into the web pages 232 via the template mechanism described above.

In another embodiment, the video application server 220 includes the server itself that processes XML-based queries and data management activities, performs searches against the video index, and returns video references and metadata via XML or other data exchange formats. Other modules of the video application server 220 include the search or browse rendering interface which processes HTML requests into XML, and additionally processes XML responses back into HTML for delivery by the web server 222 using templates to format and render the XML data into HTML.

Figure 3:
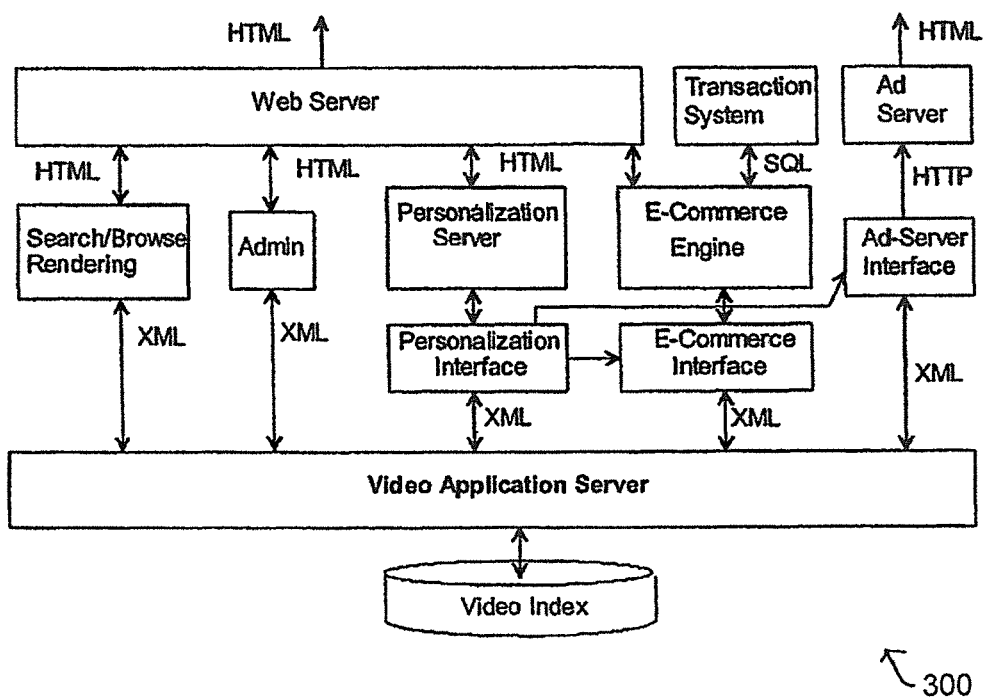
FIG. 3 is a block diagram showing a high-level system view of the example video application server embodiment shown in FIG. 2 and the server's interaction with e-commerce subsystems.

In one embodiment, the video application server's 220 XML-based open architecture allows for simple integration of additional features and functions, such as, for example, an e-commerce engine as shown in FIG. 3. Such functions may be implemented in various commonly used programming languages, for example Perl, C, C++, Java, or other programming languages, and may utilize publically or commercially available packages for parsing and formatting XML or other data exchange formats.

FIG. 3 is a block diagram showing a high-level view 300 of the video application server (VAS) and it's interaction with e-commerce, targeted advertising, and personalization subsystems. A video application server architecture includes the server that processes XML-based queries and data management activities, performs searches against the video index, and returns video references and metadata via XML. One such architecture is described in U.S. application Ser. No. 09/827,772, filed Apr. 6, 2001 and titled "Interactive Video Application Hosting" and which was incorporated by reference above. Other modules of the application server include a Search/Browse rendering interface which processes HTML requests into XML, and also processes XML responses back into HTML for delivery by the Web server using templates to format and render the XML data into HTML; and, the Administration module that allows system administrators to manage the application server (index management, asset management, editing, start-up/shut-down, etc.).

The video application server's open, XML-based, architecture readily allows the integration of additional features and functions, from syndication engines, commerce building mechanisms, to the e-commerce, targeted advertising systems, and personalization modules contemplated here. Any such modules can be implemented in any of several commonly used languages (Perl, C, C++, Java, etc.), and can utilize publically and commercially available packages of subroutines for parsing and formatting XML.

The Personalization Server in FIG. 3 interacts with the Personalization Interface through any of a number of communication mechanisms, including HTML, XML, and proprietary protocols specific to the Personalization Server employed. The main task of the Personalization Interface is to mediate between the protocol and semantic vocabulary of the chosen Personalization Server and the Video Application Server's XML interface. The VAS serves as a persistent store of state information about individual users to maintain profiles on behalf of the Personalization Server. Personalization features are rendered in HTML for the end user, which allows the user to select categories, topics, and preferences to help define their individual profile. Some Personalization Servers will also allow for monitoring of individual's activity and behavior to more accurately characterize the preferences of the end user. This is referred to as 'learning behavior' and allows the personal profile to grow and change over time. The system can accommodate a range of capabilities within the Personalization Server, and can supply context and monitoring information about the user in question. Typically, user-specific profiles and behavior information can be stored within a "cookie" on the user's own computer, set-top box, etc., thus insuring privacy. The value of personalization technology relevant to the system is in its ability to direct and select the presentation of e-commerce and advertising opportunities for the end user. The Personalization Interface module is the connective mechanism between the detailed information about the user, the detailed information about the content (based on the automatic indexing), and the range of available commerce and advertising opportunities that could be presented to the user at any given point in time, based on the content being viewed and the user in question.

The e-commerce engine embodiment shown in FIG. 3 represents any of a number of commercially available engines for processing e-commerce transactions by interfacing with standard transaction infrastructure, represented by the Transaction System module. The Transaction System in reality represents the diverse processing subsystems typified by offerings from SAP and others present in many commercial enterprises. The Transaction System interfaces with databases, order processing subsystems, shipping, inventory, billing, and customer services systems. In the system, the e-commerce interface is responsible for mediating between the various information sources (personalization and video content via the Video Application Server) that determine which e-commerce opportunity should be presented to the end user at any given point in time, based on the video content and the preferences of the user. The e-commerce opportunity is presented to the user in an HTML framework, and should the user select a commercial transaction, control is passed to the e-commerce engine from the e-commerce interface.

The ad server mechanism embodiment shown in FIG. 3 represents any of a number of commercial ad server vendors, most of which offer facilities for requesting a topic-specific ad in response to a request that contains category information. The primary task of the ad interface is to mediate between the content-specific and personal profile-specific information (via XML) and the protocol of the ad server. The result of a request is a targeted ad (in the form of a banner, video clip, etc.) that is presented to the user via HTML in context with the video clip being served by the video application server.

Figures 4, 5:
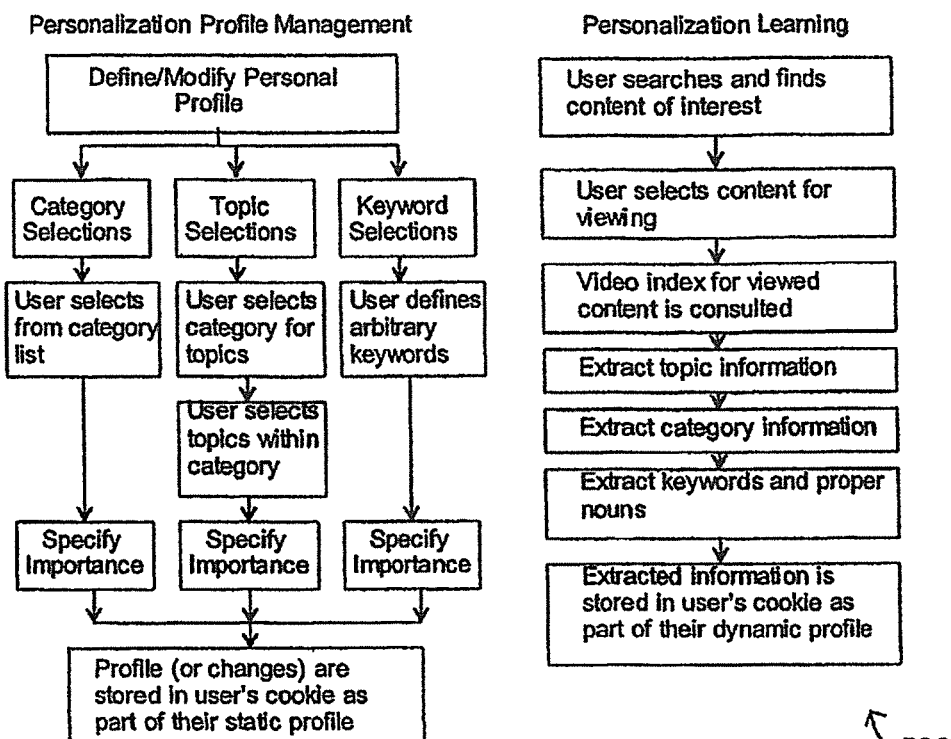
FIG. 4 is a flowchart showing an example process of gathering and managing personalization profile information from the user to define their static personal profile such as performed on the example architecture embodiment shown in FIG. 2.
FIG. 5 is a flowchart showing an example process of gathering and managing personalization profile information based on the user's viewing habits to define their dynamic personal profile such as performed on the example architecture embodiment shown in FIG. 2.

FIG. 4 is a flowchart showing a process 400 of gathering and managing personalization profile information from the user to define their static personal profile. The exact mechanism and profile information gathered in this process 400 is dependent on the personalization server employed in the system; the process 400 depicted in FIG. 4 is merely offered as an example of the types of profile information that can be gathered and the manner in which a system might interact with a user to gather such information. The process 400 begins when the user elects to define or modify their personal profile. Typically, the user may select categories, topics within those categories, and arbitrary keywords to define their static profile. This profile information is actively defined by the user, and is stored on their behalf, being relatively static in the sense that it does not dynamically update based on their viewing habits. Categories are typically selected from a pre-defined list of available categories, and might include things like 'politics', 'sports', 'science', etc. Topics are a further refinement within a category, and might include things like 'presidential elections', 'hockey highlights', or 'the moons of Jupiter'. Topic selection first begins by selecting a category within which specific topics are selected from pre-defined lists. Keywords, unlike categories and topics, are specified with a free-form entry, and are not pre-defined. Keywords are typically any word or set of words that the user deems of interest to them that might appear in the transcript of the video. Examples of keywords include proper nouns (persons, places, locations, or organizations) and other nouns that carry information important to the user. A given personalization server might employ any or all of these methods of defining a personal profile. Additionally, some personalization servers may also allow the specification of a weighting mechanism to identify the importance of each selection. For example, 'science' may be more important to the user than 'politics', and the user will be offered the ability to indicate this distinction through an importance rating (High, Medium, Low) or a numerical weighting value. In one embodiment, the profile information is stored on the user's behalf using a standard 'cookie' mechanism to maintain the profile on the user's local computer, thus insuring privacy. The VAS can then later access this information when the user's profile is required for commerce or advertising purposes.

FIG. 5 is a flowchart showing a process 500 of gathering and managing personalization profile information based on the user's viewing habits to define their dynamic personal profile. The dynamic profile is constantly updated based on the video content that the user views. The process 500 is invoked whenever the user proactively searches for content and chooses to view it. At this point, the video metadata previously extracted during the indexing process is consulted to extract category, topic, and keyword information that can contribute to the user's dynamic personal profile. This information is readily available as part of the video index, and can be easily gathered and added to the dynamic profile of the user. The dynamic profile is stored and accessed using the standard 'cookie' mechanism previously described for the static profile process 400 described in conjunction with FIG. 4.

Figures 6A, 6B:
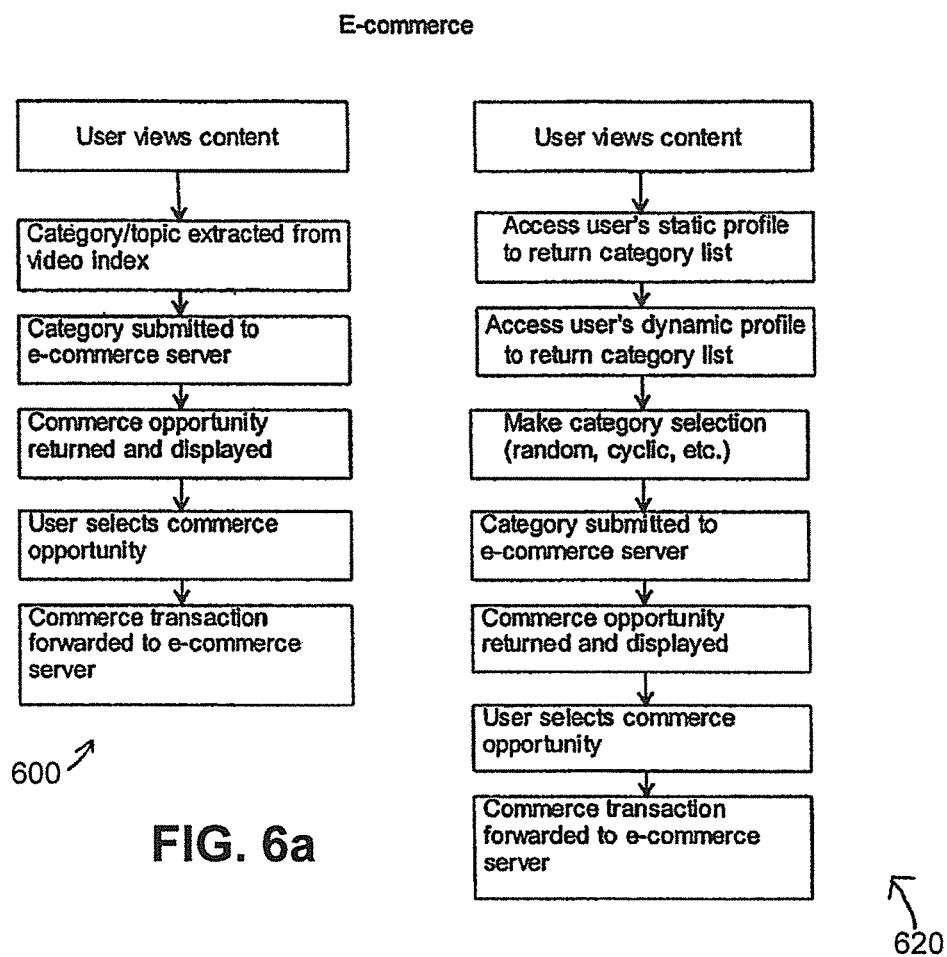
FIGS. 6a, 6b and 6c are flowcharts showing an example delivery and response to a targeted e-commerce offering such as performed on the example architecture embodiment shown in FIG. 2.
Figure 6C:
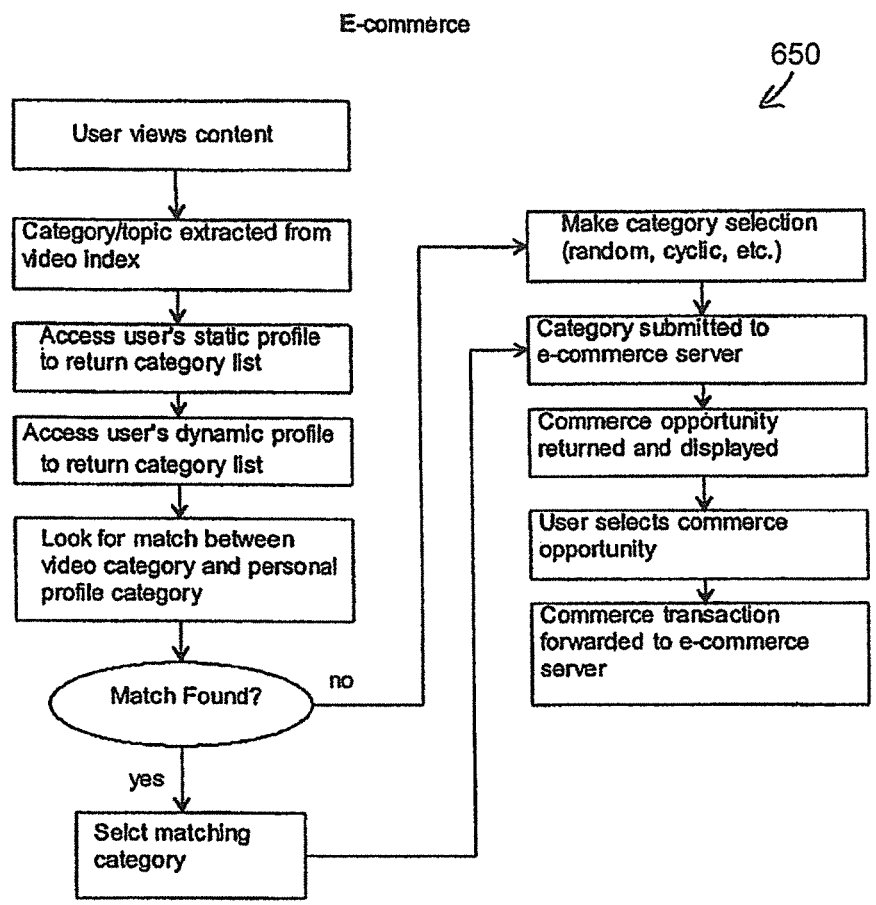

FIGS. 6a, 6b and 6c are flowcharts showing the delivery and response to a targeted e-commerce offering. FIG. 6a illustrates a process 600 of making a targeted e-commerce opportunity available based on the subject information of the video being viewed at that moment by the user. FIG. 6b illustrates a similar process 620 based on using the personal profile information of the user. FIG. 6c illustrates a combined process 650 of using both the video content and the personal profile information to make an e-commerce opportunity available. In each case, an opportunity to make a purchase of a product or service is offered to the user in conjunction with viewing a video. This is similar to advertising in traditional broadcast video, but with two important differences. The first is that the commerce opportunity is offered concurrently with the viewing of the video. The second is that it is more than an advertisement; if the user selects the opportunity (either interrupting their viewing experience, or after their viewing experience is complete), the user can actually complete a purchase on the spot.

The process 600 shown in FIG. 6a begins with the user viewing a selected video clip. The video index is then consulted to extract the corresponding category information for that clip. The category (for example, 'sports') is submitted to the e-commerce server to request a commerce opportunity corresponding to the category (for example, a hockey highlights video for purchase). The commerce server returns the purchase opportunity, typically in the form of a graphic description of the highlights video available for purchase. If the user clicks on the opportunity, the purchase transaction is forwarded to the commerce server for fulfillment. At this point, detailed purchase information is gathered by the commerce server (such as DVD or video tape, billing and shipping information, etc.), and the commerce transaction is completed.

The process 620 shown in FIG. 6b is similar to the process 600 in FIG. 6a, except that the category information is extracted from the personalization profile(s) of the user. In this case, more than one category selection is usually present. Therefore, the process 620 includes a step to make a single category selection from the plurality of categories present in the personal profile. The selection mechanism can be any of a number of algorithms, including random selection (using a random number generator), cyclic (or 'round-robin' selection), or least-recently-used. The selected category is then submitted to the commerce server, and the transaction continues as for FIG. 6a.

FIG. 6c depicts the combined process 650 that uses the video category information in conjunction with the personal profile information. In this case, the system attempts to make a match between the video category and any of the categories present in the personal profile. If a match is found, the matching category is submitted to the commerce server as before. If no match is found, the selection mechanism (random, cyclic, etc.) is used to select a category, and the process 650 proceeds as before.

Figure 7A:
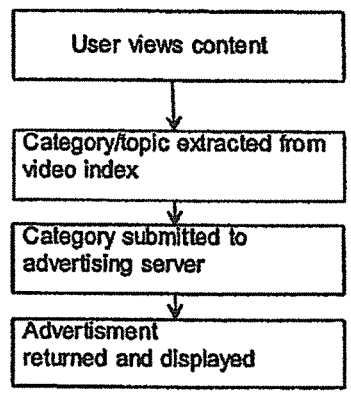
FIGS. 7a, 7b and 7c are flowcharts showing example processes for using content-based and personalization-based information to deliver a targeted advertisement such as performed on the architecture embodiment shown in FIG. 2.
Figure 7B:
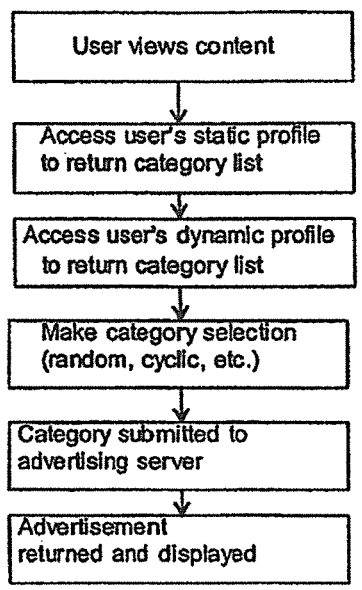
Figure 7C:
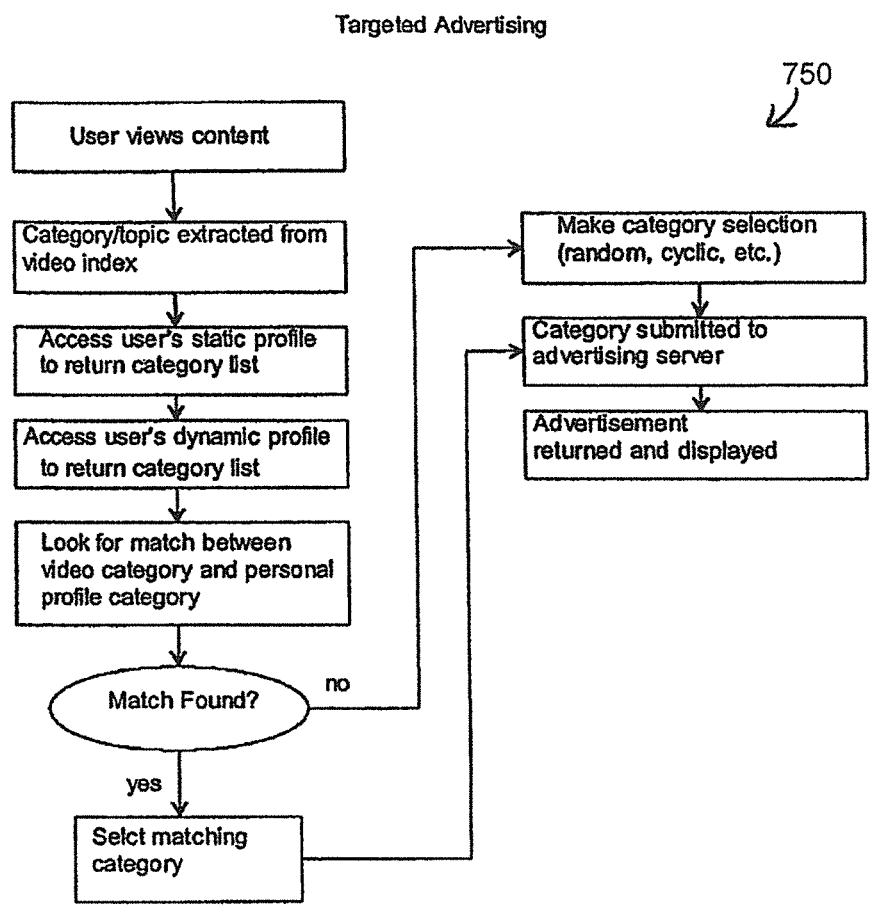

FIGS. 7a, 7b and 7c are flowcharts showing processes using content-based and personalization-based information to deliver a targeted advertisement. FIG. 7a illustrates a process 700 of making a targeted advertising available based on the subject information of the video being viewed at that moment by the user. FIG. 7b illustrates a similar process 720 based on using the personal profile information of the user. FIG. 7c illustrates a combined process 750 of using both the video content and the personal profile information to make an advertisement available. In each case, an advertisement is offered to the user in conjunction with viewing a video. Typical advertisements can be clicked upon by the user to find out more information, be transported to another website, and potentially make a purchase there.

The process 700 shown in FIG. 7a begins with the user viewing a selected video clip. The video index is then consulted to extract the corresponding category information for that clip. The category (for example, 'science') is submitted to the advertising server to request an advertisement corresponding to the category (for example, 'come learn about space at Space.com). The ad server returns the advertisement, typically in the form of a clickable banner ad or video clip. If the user clicks on the ad, their browser typically connects to another website pertaining to the advertisement.

The process 720 shown in FIG. 7b is similar to the one in FIG. 7a, except that the category information is extracted from the personalization profile(s) of the user. In this case, more than one category selection is usually present. Therefore, the process 720 includes a step to make a single category selection from the plurality of categories present in the personal profile. The selection mechanism can be any of a number of algorithms, including random selection (using a random number generator), cyclic (or 'round-robin' selection), or least-recently-used. The selected category is then submitted to the advertising server, and the process 720 continues as described for FIG. 7a.

FIG. 7c depicts a combined process 750 that uses the video category information in conjunction with the personal profile information. In this case, the system attempts to make a match between the video category and any of the categories present in the personal profile. If a match is found, the matching category is submitted to the advertising server as before. If no match is found, the selection mechanism (random, cyclic, etc.) is used to select a category, and the process 750 proceeds as before.

Embodiments of the system and method may use:
video indexing tools to automatically extract textual metadata used in search processes and to generate categories automatically for commerce associations.
video indexing tools to carefully place commerce tags as time-stamped elements to be associated with the video content during playback.
personalization agents to gather and generate user profiles and demographic information to be consulted by the video server technology.
video and search serving technology to exploit the commerce tags in the video content and the personalization profile of the user watching the video to make decisions about which ads, products, and/or services should be presented to the user.
the presence of commerce tags in the video stream combined with personalization profiles to allow interaction with viewers in a highly targeted manner so as to achieve true, 1-to-1 marketing and sales on large populations.

As described herein, certain embodiments fill the longstanding need in the technology of a system that provides commerce oriented websites the capability to achieve their e-commerce goals by exploiting video processing capabilities using rich and interactive media content. While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The scope of the invention is indicated by the appended claims rather than by the foregoing description. All changes that come within the meaning and range of equivalency of the claims are to be embraced within their scope.

What is claimed is:

1. A method of delivering targeted advertisement, said method comprising:
  determining, by a processor, video content being viewed by a user;
  determining, by the processor, from a database on which is stored a plurality of correlations between tags and video content, a tag correlated to the determined video content being viewed by the user on a time-code basis, wherein the tag is a time-stamped element in the determined video content being viewed by the user and is valid for a certain span of time within the determined video content being viewed by the user;
  accessing, by the processor, an advertisement correlated with the determined tag in response to a current time of viewing being within the certain span of time within the determined video content; and
  displaying the accessed advertisement to the user.

2. The method according to claim 1, wherein determining the tag further comprises consulting a video index of the video content to extract the tag corresponding to the video content being viewed by the user.

3. The method according to claim 2, wherein consulting the video index of the video content further comprises consulting the database on which the video index of the video content is stored.

4. The method according to claim 2, further comprising:
  accessing a user profile category of the user, wherein the user profile category corresponds to a particular category;
  determining whether there is a matching category between a category of at least one of the video content and the user and the particular category of the user profile category; and
  determining the category of the at least one of the video content and the user to be the matching category in response to a determination that there is a matching category.

5. The method according to claim 4, further comprising selecting the category from a plurality of available categories through implementation of a selection technique in response to a determination that there is no matching category.

6. The method according to claim 1, further comprising:
  accessing a user profile of the user; and
  determining a category of at least one of the video content and the user based upon the user profile of the user.

7. The method according to claim 1, wherein accessing the advertisement corresponding to the determined category correlated with the determined tag further comprises:
  submitting a determined category of at least one of the video content and the user to one of an advertising server and an e-commerce server, wherein the advertising server or the e-commerce server is to select the advertisement from the determined category; and
  receiving the selected advertisement from the advertising server or the e-commerce server.

8. The method according to claim 1, wherein displaying the accessed advertisement to the user further comprises displaying the accessed advertisement concurrently with the video content being viewed by the user.

9. The method according to claim 1, further comprising:
receiving a selection of the displayed advertisement; and
directing the user to a server associated with the displayed advertisement.

10. An apparatus for delivering targeted advertising, said apparatus comprising:
a memory on which is stored machine readable instructions to:
determine video content being viewed by a user;
determine a tag correlated to the determined video content being viewed by the user on a time-code basis, wherein the tag is a time-stamped element in the determined video content being viewed by the user and is valid for a certain span of time within the determined video content being viewed by the user;
access a particular advertisement associated with the tag in response to a current time of viewing being within the certain span of time within the determined video content; and
display the accessed advertisement to the user; and
a processor to execute the machine readable instructions.

11. The apparatus according to claim 10, wherein the machine readable instructions are further to:
access a user profile category of the user, wherein the user profile category corresponds to a particular category;
determine whether there is a matching category between a category of at least one of the video content and the user and the particular category of the user profile category; and
wherein the machine readable instructions are further to determine the category of the at least one of the video content and the user to be the matching category in response to a determination that there is a matching category.

12. The apparatus according to claim 11, wherein the machine readable instructions are further to:
select the category from a plurality of available categories through implementation of a selection technique in response to a determination that there is no matching category.

13. The apparatus according to claim 10, wherein the machine readable instructions are further to:
access a user profile of the user; and
wherein the machine readable instructions are further to determine the category based upon the user profile of the user.

14. The apparatus according to claim 10, wherein the machine readable instructions are further to display the accessed advertisement concurrently with the video content being viewed by the user.

15. The apparatus according to claim 10, wherein the machine readable instructions are further to:
receive a selection of the displayed advertisement; and
direct the user to a server associated with the displayed advertisement.

16. The apparatus according to claim 10, wherein the advertisement comprises at least one of an ad banner, a product offering, and a service offering.

17. A non-transitory computer readable storage medium on which is stored machine readable instructions that when executed by a processor are to cause the processor to:
determine video content being viewed by a user;
consult a database containing information pertaining to a plurality of correlations between tags and video content to determine a tag correlated to the determined video content being viewed by the user on a time-code basis, wherein the tag is a time-stamped element in the determined video content and is valid for a certain span of time within the determined video content being viewed by the user;
access an advertisement correlated with the tag in response to a current time of viewing the video content being within the certain span of time within the determined video content; and
display the accessed advertisement to the user.

* * * * *